June 17, 1947. A. W. TONDREAU 2,422,270

CAMERA

Original Filed Oct. 27, 1944 5 Sheets-Sheet 1

INVENTOR.
ALBERT W. TONDREAU,
BY
W. E. Beatty
ATTORNEY

June 17, 1947. A. W. TONDREAU 2,422,270
CAMERA
Original Filed Oct. 27, 1944 5 Sheets-Sheet 2

ALBERT W. TONDREAU,
INVENTOR.

BY

ATTORNEY

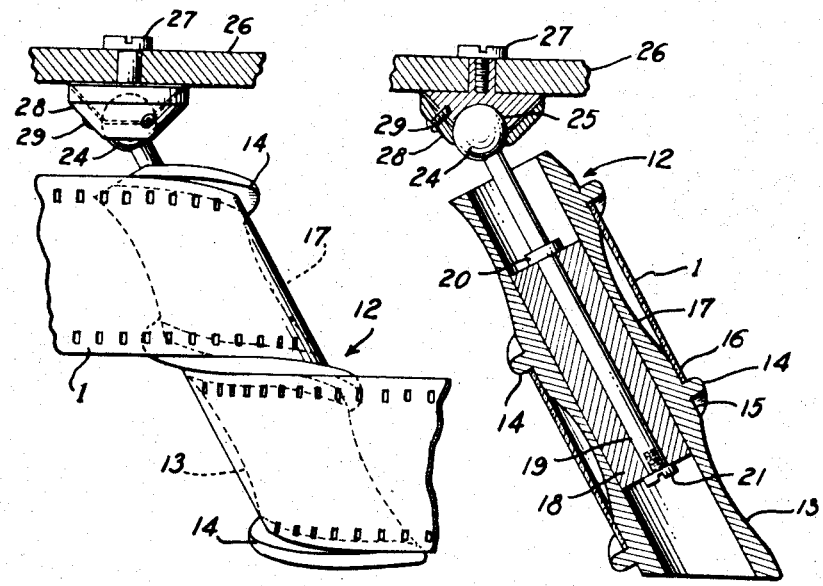
Fig. 3.
Fig. 4.
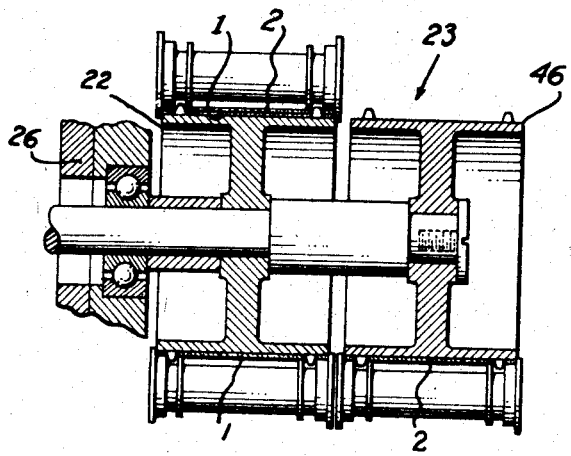
Fig. 5.
ALBERT W. TONDREAU
INVENTOR.

June 17, 1947.   A. W. TONDREAU   2,422,270
CAMERA
Original Filed Oct. 27, 1944   5 Sheets-Sheet 4
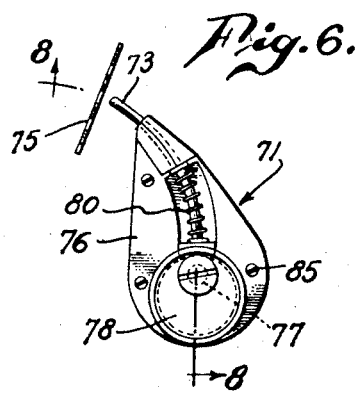
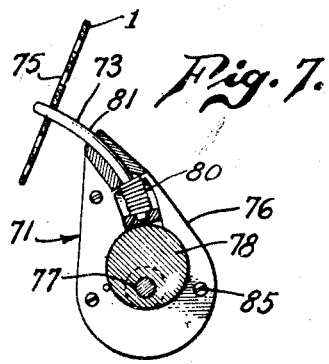
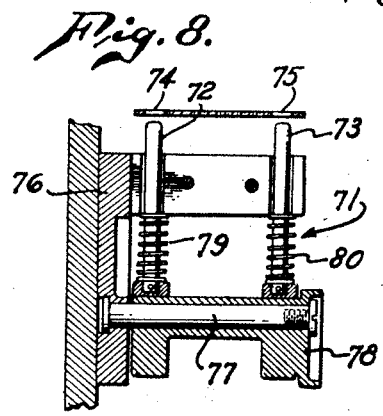
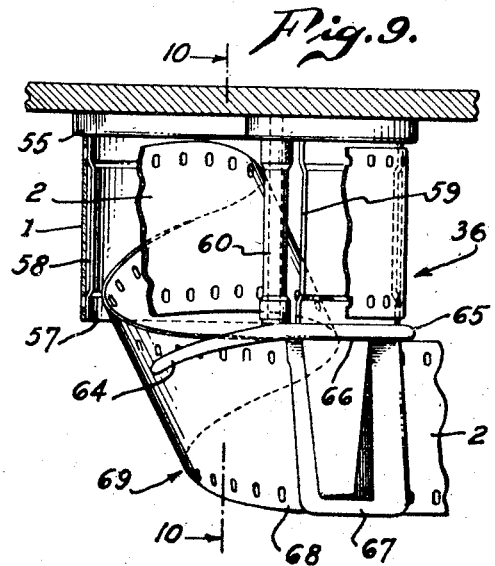
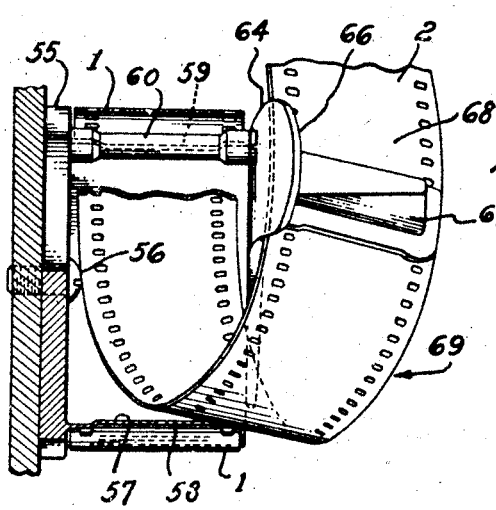
ALBERT W. TONDREAU,
INVENTOR.
BY
ATTORNEY

ALBERT W. TONDREAU, INVENTOR.

BY _W. W. Beatty_

ATTORNEY.

Patented June 17, 1947

2,422,270

UNITED STATES PATENT OFFICE 2,422,270

CAMERA

Albert W. Tondreau, North Hollywood, Calif., assignor to Warner Bros. Pictures, Inc., New York, N. Y., a corporation of Delaware Original application October 27, 1944, Serial No. 560,546. Divided and this application April 27, 1945, Serial No. 590,544

5 Claims. (Cl. 88—16.4)

1

The present invention relates to a camera for color photography and in particular relates to an improvement in the camera disclosed and claimed in Patent No. 2,353,797, issued to me July 18, 1944.

One of the objects of the present invention is to facilitate threading the bi-pack and one of the films thereof through the two gates to initially position the films in the gates so that the pull-down mechanisms and the register pin mechanisms will engage the sprocket holes in the films, and in particular to so locate the film which is to have two color records thereon, that the alternate frames left unexposed at one gate will be exposed at the other gate.

In the above patent a free loop of film was arranged between one of the feed sprockets and the common sprocket, by reason of the fact that two films were fed into the camera each on a separate feed sprocket and one of the films on the trailing side of the feed sprocket was given a loop in order to overlap it with the other film to form a bi-pack on the common sprocket. It has been found that the presence of this free loop is objectionable as the film slaps the side of the camera casing and is likely to be scratched. An object of the invention is to transfer two films from a side-by-side relation without using a free loop. This is accomplished by employing a spiral film guide which leads one of the films from its feed sprocket into bi-pack relation with the other film at the common sprocket.

Also, in the above patent, a free double loop was proposed in the back film of the bi-pack at a point between the two film gates at the point where the bi-pack, after being exposed at one gate, was separated so that the back film thereof could be passed through the other gate, the front film being led directly to the common sprocket. The presence of this free loop is also objectionable for reasons similar to those pointed out above. Another object of the invention is to avoid the use of a free loop between the film gates, and this is accomplished by a film guide which separates the bi-pack after exposure at the bi-pack gate, the film guide serving to guide one of the films to the other gate for further exposure and to guide the other film to a common sprocket. The film guide also performs the function of providing a film path of fixed length between the two gates to thereby facilitate proper location in the gates of the film bearing two color records.

The above patent also proposed to employ a rather long free loop of the film which passes

2 through both gates, at the leading side of the common sprocket. It has been found that a long loop at this point is objectionable and an object of the present invention is to avoid it. This is accomplished by providing a take-up sprocket at the exit side of the second gate with a smaller loop between that sprocket and the second gate, and with a tight film path between that sprocket and the common sprocket.

As the above patent employed a single common sprocket on which both films were fed in bi-pack relation to the gates and also from the gates, it being desirable to store the exposed films in separate film cans, the above patent proposed to transfer the bi-pack film from the exit side of the common sprocket to two take-up sprockets by separating one film laterally from the other by the use of a free loop. This free loop is also objectionable for reasons pointed out above, and an object of the invention is to avoid its use. This has been accomplished according to the present invention by employing a double common sprocket having two sprockets side-by-side by using one of these sprockets to traverse the bi-pack to the gates, while obtaining a side-by-side relation of the films on the take-up side of the common sprocket by leading the film from the gates separately to each of these two sprockets, whereby a tight film path may be obtained from the double sprockets of the double common sprocket to the take-up sprockets without the use of a loop therebetween.

For further details of the invention, reference may be made to the drawings, wherein:

Fig. 3 is an enlarged plan view partly in section, of a spiral film guide according to the present invention.

Fig. 4 is a longitudinal cross-sectional view of the film guide of Fig. 3.

Fig. 5 is an enlarged sectional view of the double common sprocket, the section having been taken on line 5—5 of Fig. 1 looking in the direction of the arrows.

Fig. 6 is an enlarged view in elevation of one of the film engaging devices provided according to the present invention to assist in properly locating the film in the gates.

Fig. 7 is a view in elevation, partly in section, of the device of Fig. 6 with parts in a different operating position.

Fig. 8 is a sectional view on line 8—8 of Fig. 6, looking in the direction of the arrows.

Fig. 9 is an enlarged view of the film guide according to the present invention, for separating the bi-pack into separate films.

Fig. 10 is a sectional view on line 10—10 of Fig. 9, looking in the direction of the arrows.

Figure 1:
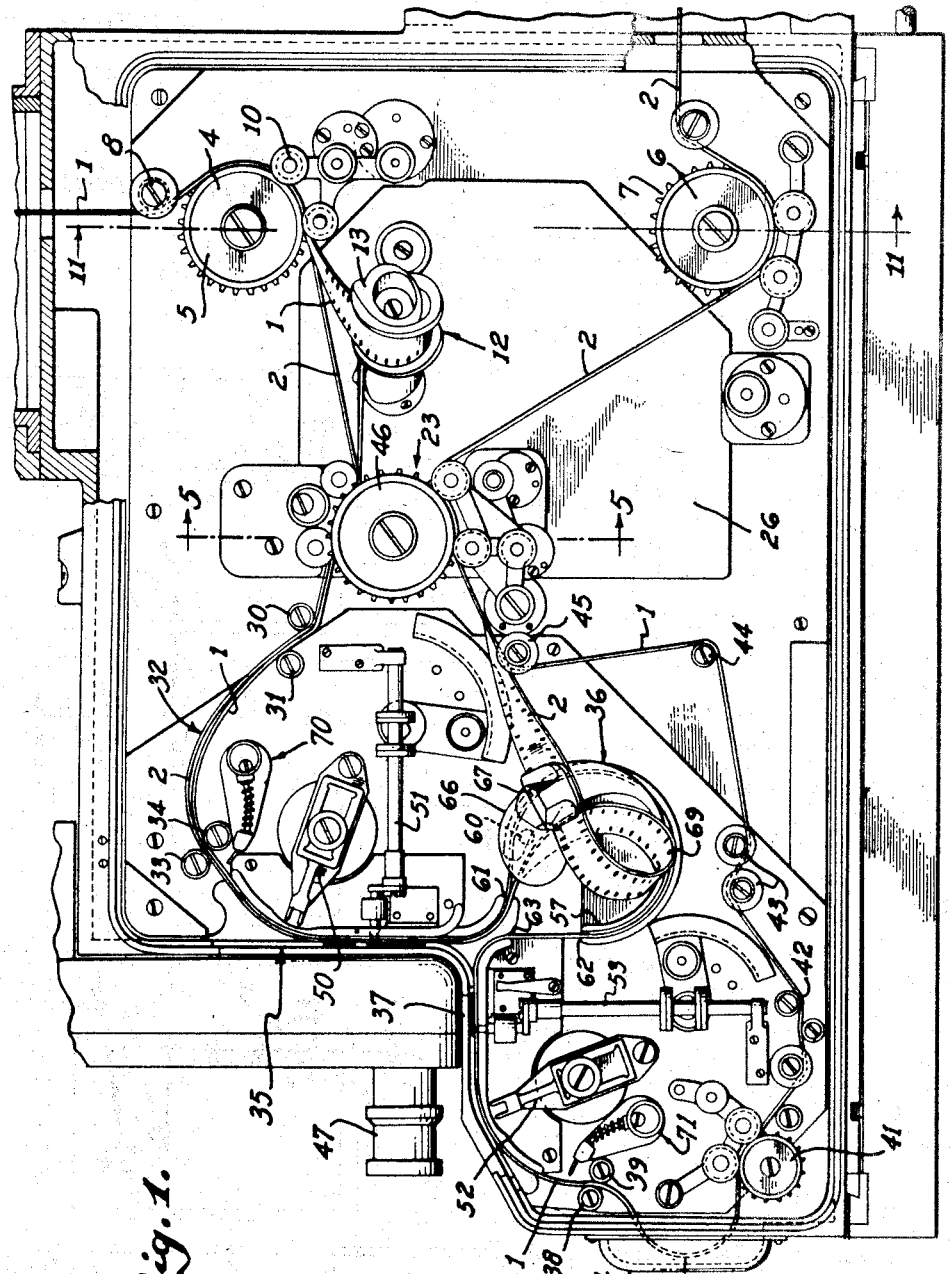
Figure 1 is a view in vertical elevation of the improved camera of the present invention, with the door of the camera removed and with certain parts of the camera wall broken away.
Figure 11:
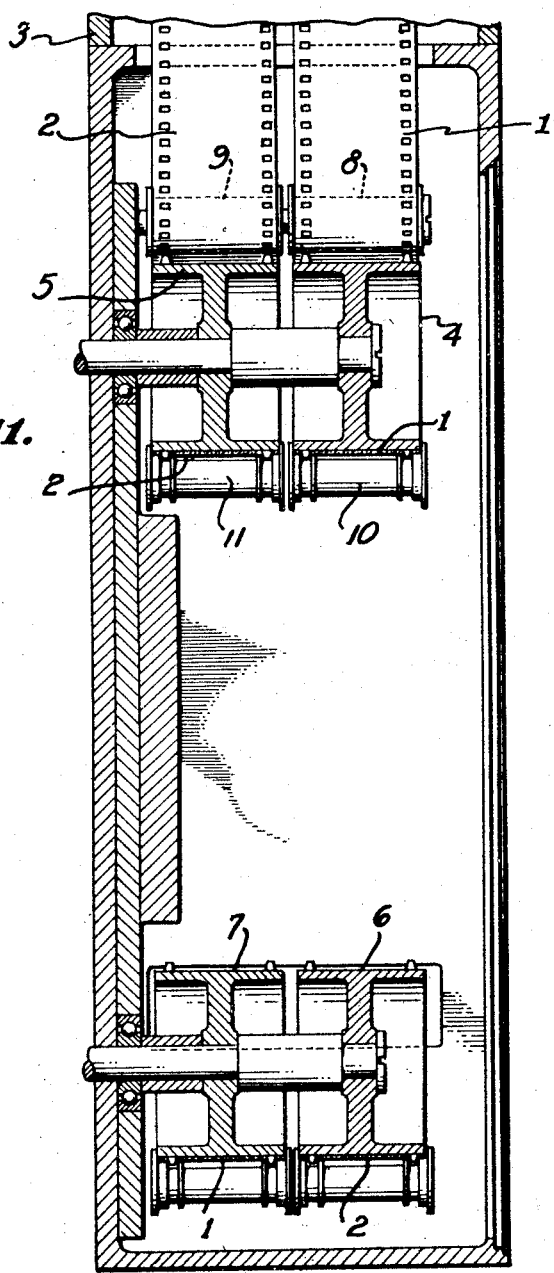
Fig. 11 is an enlarged sectional view on line 11—11 of Fig. 1, looking in the direction of the arrows.

Referring in detail to the drawings, as in the above patent, and as shown in Figs. 1 and 11, two unexposed negative films 1 and 2 are fed into the camera along parallel paths from a removable film can, the base of which is indicated at 3 in Fig. 1. The films 1 and 2 are led over aligned feed sprockets 4 and 5, respectively, then through the camera mechanism and after exposure are led out from the camera over two aligned feed sprockets 6 and 7 to take-up reels not shown.

As in the above patent, the films 1 and 2 are traversed across their respective gates two frames at a time, to expose film 1 which forms the back film of the bi-pack with two color records, with a third color record on the other film 2.

Generally speaking, the improvements according to the present invention relate to the film traversing and threading means employed in the camera between the supply sprockets 4, 5 and the take-up sprockets 6, 7.

The present invention discloses a number of features which are described and claimed in the above patent and the cases referred to therein, as well as the following copending applications filed in my name, "Camera for color photography," Serial Nos. 476,179, 476,180, and 476,181, filed February 17, 1943.

The feed sprockets 4, 5 are provided with suitable guide rollers 8 and 9 and with suitable pad rollers 10 and 11.

In order to lead the two films 1 and 2 from a position parallel to each other as shown in Fig. 11, to a bi-pack position with the emulsions facing each other, and without employing a free loop, the film 1 is led from its feed sprocket 4 over a stationary and adjustable spiral guide 12. The spiral guide 12 as shown in Figs. 3 and 4, comprises a tube 13 having thereon a spiral flange 14, the distance between adjoining convolutions thereof being the same as the width of the film. Each side of the spiral flange 14 is provided with a shoulder as indicated at 15 and 16, with an intermediate cutaway portion 17, to support the film only at its edges. The tube 13 is rigidly secured to an internal plug 18 along the axis of which is a supporting rod 19 clamped in position between the shoulder 20 and the screw 21, to permit rotational adjustment of the tube 13 on the rod 19 so as to line up the spiral guide 12 so that certain adjoining convolutions of the spiral flange 14 will be in position to receive film 1 from the sprocket 4 while other adjoining convolutions will be in a position to lead the film 1 underneath the film 2 onto the top of the back sprocket 22 of a double common sprocket 23 as shown in Fig. 5. In other words, the sleeve 13 is rotatably adjustable about its own axis by rotating sleeve 13 and plug 18 on the rod 19, and locking it in adjusted position by the screw 21. Also, the spiral guide 12 can have its axis angularly adjusted as rod 19 terminates in a ball 24 which comprises one member of a universal joint having a socket 25 fixed to the plate 26 by a screw 27. A clamping plate 28 held in position by a screw 29 adjustably holds the ball 24 and, hence, spiral guide 12 in its adjusted position.

From the rear common sprocket 22, the films 1 and 2 are led in bi-pack relation, emulsion to emulsion, through guide rollers 30 and 31 (Fig. 1) then in a loop indicated at 32 through suitable guide rollers 33 and 34 through the bi-pack gate 35.

At the exit side of the bi-pack gate 35, the films 1 and 2 are separated, the film 1 which is the rear film of the bi-pack passing around an arcuate stationary film guide 36 and then passing through the single film gate 37. From the exit side of gate 37 the film 1 is led by suitable guide rollers 38 and 39 through a loop indicated at 40, which may be housed in a casing extension 54, then through the take-up sprocket 41, and without any further free loops is led through a number of guide rollers indicated at 42, 43, 44 and 45 to the underside of the rear common sprocket 22. The film guide 36 includes means later described for separating the films from their bi-pack relation and for also leading the front film 2 of the bi-pack to the front sprocket 46 (Figs. 1 and 5) of the common sprocket 23. Hence, the lower side of the sprocket 22 is individual to film 1, the lower side of the sprocket 46 is individual to film 2, these films extending in parallel paths side-by-side on these sprockets and from that point these films are led without further loops directly to their respective take-up sprockets 6 and 7 shown in Fig. 11. It will be noted that the film 1 enters the camera on the front supply sprocket 4 and leaves the camera on the rear take-up sprocket 7 while film 2 enters the camera on the rear supply sprocket 5 and leaves the camera on the front take-up sprocket 6.

All sprockets shown are provided with suitable pad rollers schematically indicated in the drawings and to which, generally, no reference numbers have been applied as their use is well understood and their construction and detail forms no part of the present invention.

Figure 2:
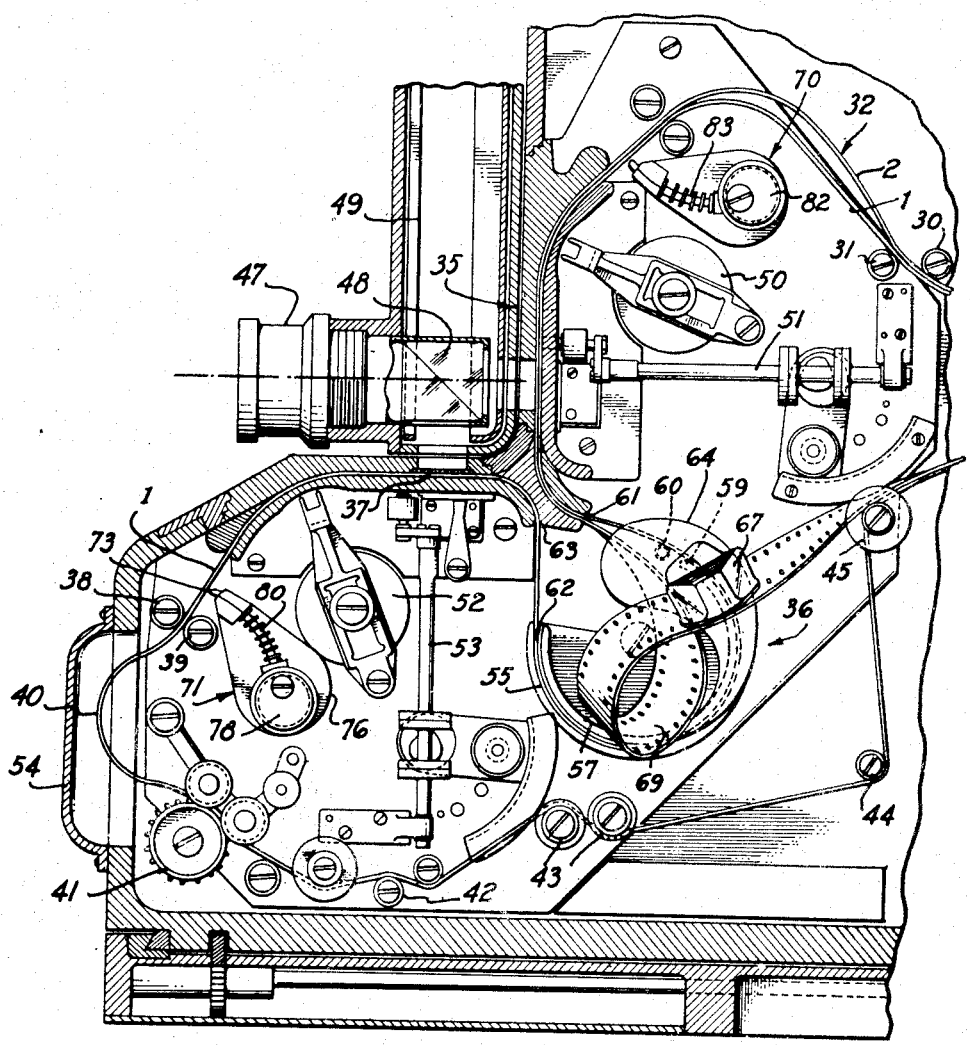
Fig. 2 is an enlarged vertical sectional view of the camera of Fig. 1 with the vertical register pin in a different operating position and with certain parts of the camera broken away.

As indicated in Fig. 2, and as described in the above patent the camera is provided with a suitable objective lens 47, light dividing prism 48, shutter 49; also pull-down mechanism 50, and register pins 51 for the bi-pack gate 35; also pull-down mechanism 52 and register pins 53 for the single film gate 37.

The power drive 4 driving the various sprockets, pull-down mechanisms and register pins illustrated and described herein, may be the same as that described in the above patent with the addition thereto of a suitable gear for driving the take-up sprocket 41.

The film guide 36, as shown in Figs. 1, 2, 9 and 10, comprises a base 55 secured to the vertical wall of the camera by a screw 56. From the base 55 extends a stationary arcuate flange 57 the middle portion of which is depressed, as indicated at 58, to support the film at its edges. The flange 57 as indicated in Figs. 1 and 2, extends generally in a circular path for more than a one-half circle, with the upper end 59 of the flange in line with a guide roller 60 and with the exit 61 from the film gate 35. The other end 62 of the flange 57 is in line with the entrance 63 to the single film gate 37. The stationary flange 57 therefore serves to guide the film 1 in an arcuate path, without a free loop, from gate 35 to gate 37. Suitably secured to the front edge of approximately the right hand one-half of the flange 57 as seen in Fig. 1, is the curved edged guiding plate 64, which as shown in Figs. 9 and 10 as indicated at 65, extends beyond the periphery of the flange 57 in order to guide the front edge of the film 1 and thereby keep it from moving to the front off from flange 57. The upper portion of the edge guiding flange 64 is tilted forwardly as indicated at 66 and from the front of the tilted portion 66 extends an arm 67 which overlies the leading end 68 of the spiral loop 69 which is made in the film 2.

The leading edge 68 is therefore led across the front of a more rearward portion of the same film, and across the front of the other film 1, as well as across the leading portion of the flange 57. Due to the spiral loop 69 in the film 2, there is some rearward tension in the leading edge 68 which tends to spring rearwardly and the rear edge of the leading portion 68 of the loop is guided and restrained by the front face of the guide plate 64. The arm 67 may be suitably secured to the front of the plate extension 64 by welding or otherwise, and the whole film guide indicated at 36 forms a double film guide unit which may be chrome plated.

In order to position the films 1 and 2 in the bi-pack gate 35 so that the sprocket holes therein are in position to be engaged by the film traversing means 50, 51, and also to position film 1 in both gates 35 and 37 for a like reason, and also to insure that gate 37 will expose alternate film frames not exposed at the other gate 35, the invention provides at the entrance side of gate 35 and at the exit side of the gate 37, the manually operable film engaging devices 70 and 71 respectively, both of which are alike, the latter being shown in detail in Figs. 6, 7 and 8.

As shown in Figs. 6 to 8, the film engaging device 71 comprises a pair of slidable pins 72 and 73 adapted to be moved to engage the film sprocket holes indicated at 74 and 75 in Fig. 8. Pins 72 and 73 are slidably mounted in a bracket 76 which may be secured to the wall of the camera by screws such as 85. Mounted in the bracket 76 is an axle 77 on which is rotatably mounted an eccentric 78 against which the pins 72 and 73 are urged by springs 79 and 80 respectively. The pins 72 and 73 enter the film at right angles as indicated in Figs. 6 and 7 and as the film pull-down mechanisms 50 and 52 do not afford enough room to locate the eccentric 78 in a right line through the film at the point where the pins 72 and 73 enter the film, the eccentric 78 is positioned off to one side and the pins 72 and 73 are curved, as shown in Figs. 1, 2, 6 and 7, and as indicated at 81 in Fig. 7. Fig. 6 shows eccentric 78 moved to a position where the pins 72 and 73 are retracted from the film while Fig. 7 shows the eccentric 78 moved to another position to force the pins 72 and 73 into sprocket holes against the action of their springs 79 and 80.

The film locating device 70 is positioned in advance of the entrance end of gate 35 and the film locating device 71 is located beyond the exit end of gate 37, both of the devices 70 and 71 being positioned where their pins such as 72 and 73 and in particular the adjacent part of the film is readily accessible so that the sprocket holes of the film can be readily fitted on these pins. A fixed and desired length of the film 2 is measured between the device 70 and 71 partly by reason of the fact that the flange 62 forms a film bath of fixed length between the two gates 35 and 37. In threading the eccentric 82 (Fig. 2) of the device 70 is operated to insert its pins similar to 72 and 73 in Fig. 8 and of which the front pin 83 appears in Fig. 2, into the sprocket holes of the bi-pack 1, 2. Then both films are threaded through the gate 35 and the double film guide 36, with the back film 1 of the bi-pack firmly engaging the flange 62 and film 1 is, of course, threaded through the gate 37 and if pulled firmly, the pins 72, 73 of the device 71 will engage the sprocket holes in the film 1. As before stated, the device 70 is so positioned in the film path that the bi-pack 1, 2, when engaged by the pins such as 83, is in proper position in the gate 35 to be engaged by the pull-down 50 and the register pins 51, it being assumed of course, that both the claw of the pull-down 50 and the register pins 51 are out of the film path at this time. The register pins 51 are then manually engaged in the sprocket holes by operating the register pin control handle 84 as described in the above patent. The device 71 is so positioned with reference to the device 70 and with reference to the length of the film path afforded by the flange 62 than when the film 1 is impaled on the pins such as 83 of the device 70 and pulled firmly in its path through gate 35 around flange 62 and through gate 37, the sprocket holes of film 1 will be in a position to be engaged by the pins 72, 73 of the device 71, and when so engaged, the film 1 is in position in gate 37 to be engaged by the claw of the pull-down device 52 and by the register pins 53, and the film 1 is furthermore positioned in gate 37 so that alternate frames not exposed at gate 35 will be exposed at gate 37, the two pull-downs 50 and 52 operating in synchronism to advance the film two frames at a time as described in the above patent. After the two films 1 and 2 have been properly located in the gates 35 and 37, and the register pins 51 and 53 released to engage the sprocket holes in the films, the eccentrics 78 and 82 are operated to retract pins such as 72 and 73 of the device 71 and the pins like 83 of the device 70. Whereupon the camera is ready for operation, it being assumed that the remainder of the threading has been completed in an obvious manner.

The pins like 72, and 73, on the device 70, and 71, are movable into and out of the normal running path of the film. The guide rollers 33, and 34, are on opposite sides of that path and the device 70, has its pins like 72, and 73, adjacent those rollers, whereby those rollers support the film and permit the pins like 72, and 73, to be stripped from the film when the device 70, is moved to idle position. For the same reason, the pins 72, and 73, of the device 71, are arranged close to the guide rollers 38, and 39, which lie on opposite sides of the film path and support the film when stripping the pins 72, and 73, therefrom on movement of the device 71, to idle position.

This application is a division of Serial No. 560,546, filed October 27, 1944, for "Camera."

It will be apparent that various modifications may be made without departing from the spirit of the following claims.

I claim:

1. An adjunctive device to assist in threading the film so that the sprocket holes therein will be in a position to be engaged by the film traversing means of a film gate, said device comprising a removable pin engageable with the sprocket holes in the film at a point in the film running path beyond the gate where the sprocket holes can be inspected and manipulated to engage the pin thereon, means supporting said pin for movement into and out of said path said pin being movable to a position in the film path so that when the sprocket hole in the film is engaged therewith, that portion of the film in the gate will have its sprocket holes in proper position to be engaged by the film traversing means.

2. Means for registering two films with each other to form a bi-pack and to locate said films in position to be engaged by the film traversing means of a film gate, said registering means comprising a manually operable pin beyond said gate temporarily engageable with the sprocket holes in both films and so positioned in the film running path that when the films are engaged therewith, they are located in the film gate in position to be engaged by the film traversing means, spring means for withdrawing said pin, and manual means to overcome or release said spring.

3. In a camera having two film gates with means for traversing the same film through both gates two frames at a time, a manually operable stop pin at the leading side of one of said gates and another stop pin at the trailing side of the other gate, film supporting means between said gates providing a film path of fixed length from one of said gates to the other gate, said pins being engageable with the film sprocket holes and being movable into the film path at points such that when engaged in the sprocket holes of the film, with the film threaded through said gates and on said supporting means, the film is in position in said gates to be engaged by the film traversing means therefor, and is also in position to have exposed at one gate alternate film frames not exposed at the other gate.

4. In a camera having two film gates with means for traversing the same film through both gates, a manually operable stop pin at the leading side of one of said gates and another manually operable stop pine at the trailing side of the other gate, film supporting means between said gates providing a film path of fixed length from one of said gates to the other gate, said pins being engageable with the film sprocket holes and being movable into the film path at points such that when engaged in the sprocket holes of the film, with the film threaded through said gates and on said supporting means, the film is in position in said gates to be engaged by the film traversing means therefor.

5. An adjunctive device according to claim 1, comprising opposed film rollers defining said path adjacent said pin.

ALBERT W. TONDREAU.

REFERENCES CITED

The following references are of record in the file of this patent:

UNITED STATES PATENTS

| Number | Name | Date |
| --- | --- | --- |
| 1,840,353 | Fear | Jan. 12, 1932 |
| 1,850,955 | Fear | Mar. 22, 1932 |
| 2,037,124 | Fear | Apr. 14, 1936 |